United States Patent
Park et al.

(10) Patent No.: US 12,322,781 B2
(45) Date of Patent: Jun. 3, 2025

(54) SLURRY TRANSFER DEVICE AND SLURRY TRANSFER METHOD USING THE SAME

(71) Applicant: LG Energy Solution, Ltd., Seoul (KR)

(72) Inventors: Chan Woo Park, Daejeon (KR); Min Gyu Park, Daejeon (KR); Woo Seok Oh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/575,584

(22) PCT Filed: Jan. 6, 2023

(86) PCT No.: PCT/KR2023/000262
§ 371 (c)(1),
(2) Date: Dec. 29, 2023

(87) PCT Pub. No.: WO2023/132675
PCT Pub. Date: Jul. 13, 2023

(65) Prior Publication Data
US 2024/0339583 A1    Oct. 10, 2024

(30) Foreign Application Priority Data
Jan. 6, 2022 (KR) .................. 10-2022-0001881

(51) Int. Cl.
*H01M 4/04* (2006.01)
*F04B 15/02* (2006.01)
(Continued)

(52) U.S. Cl.
CPC ............... *H01M 4/04* (2013.01); *F04B 15/02* (2013.01); *F04B 43/026* (2013.01); *F04B 43/04* (2013.01);
(Continued)

(58) Field of Classification Search
CPC ... H01M 4/04; H01M 2004/027; F04B 15/02; F04B 43/026; F04B 43/04; F04B 43/06;
(Continued)

(56) References Cited

U.S. PATENT DOCUMENTS 4,118,778 A * 10/1978 Strub .................. B01D 37/046
700/271
4,966,528 A * 10/1990 Henkel ................ F04B 43/009
417/63
(Continued)

FOREIGN PATENT DOCUMENTS

CN 112170125 A 1/2021
JP H1193844 A 4/1999
(Continued)

OTHER PUBLICATIONS

International Search Report for Application No. PCT/KR2023/000262 mailed Apr. 14, 2023, pp. 1-3.
(Continued)

*Primary Examiner* — William M McCalister
(74) *Attorney, Agent, or Firm* — Lerner David LLP

(57) ABSTRACT

The present invention relates to a slurry transfer device, and a slurry transfer method using the same, which relates to, particularly, a negative electrode slurry transfer device for a secondary battery, and a method of transferring a negative electrode slurry for a secondary battery using the same. According to a slurry transfer device related to one example of the present invention, and a slurry transfer method using the same, it is possible to prevent the quality of the slurry from deteriorating during transfer, and to increase the filter replacement cycle.

14 Claims, 3 Drawing Sheets

(51) Int. Cl.
*F04B 43/02* (2006.01)
*F04B 43/04* (2006.01)
*F04B 43/06* (2006.01)
*F04B 49/06* (2006.01)
*F04B 49/08* (2006.01)
*F04B 53/20* (2006.01)
*G05D 7/06* (2006.01)
*H01M 4/02* (2006.01)

(52) U.S. Cl.
CPC .............. *F04B 43/06* (2013.01); *F04B 49/06* (2013.01); *F04B 49/08* (2013.01); *F04B 53/20* (2013.01); *G05D 7/0635* (2013.01); *F04B 2205/05* (2013.01); *H01M 2004/027* (2013.01)

(58) Field of Classification Search
CPC .......... F04B 49/06; F04B 49/08; F04B 53/20; G05D 7/0635
See application file for complete search history.

(56) References Cited

U.S. PATENT DOCUMENTS

| | | | |
|---|---|---|---|
| 6,109,881 A | | 8/2000 | Snodgrass et al. |
| 6,126,403 A | * | 10/2000 | Yamada ............. F04B 43/0081 417/46 |
| 6,544,424 B1 | * | 4/2003 | Shevitz .................. C12M 47/02 210/636 |
| 10,747,240 B1 | * | 8/2020 | Surjaatmadja .......... F04B 23/04 |
| 2006/0219642 A1 | | 10/2006 | Farnham et al. |
| 2009/0202361 A1 | | 8/2009 | Reed et al. |
| 2014/0109763 A1 | * | 4/2014 | Reed ................... F04B 43/0736 92/48 |
| 2016/0169219 A1 | * | 6/2016 | Gillespie, III .......... F04B 49/22 417/212 |
| 2024/0339583 A1 | * | 10/2024 | Park ........................ F04B 53/20 |

FOREIGN PATENT DOCUMENTS

| | | |
|---|---|---|
| JP | 2017027708 A | 2/2017 |
| JP | 2017054762 A | 3/2017 |
| KR | 19990028192 A | 4/1999 |
| KR | 20180105969 A | 10/2018 |
| WO | 2012066911 A1 | 5/2012 |
| WO | 2019028267 A1 | 2/2019 |

OTHER PUBLICATIONS

Extended European Search Report including Written Opinion for Application No. 23737423.6 dated Jul. 30, 2024, pp. 1-11.

* cited by examiner

[Figure 1]
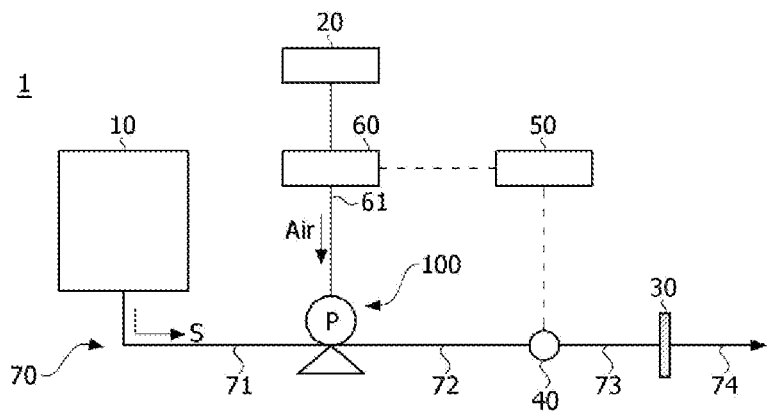
[Figure 2]
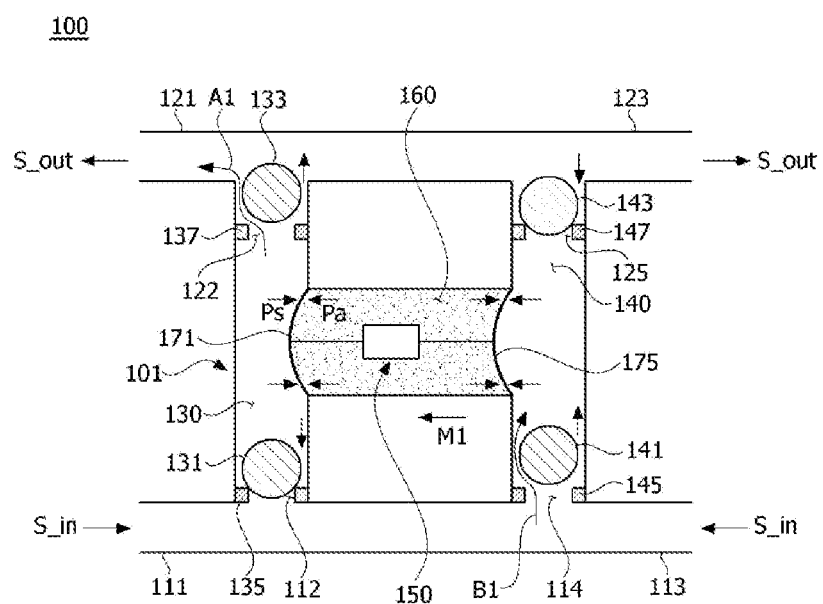

[Figure 3]
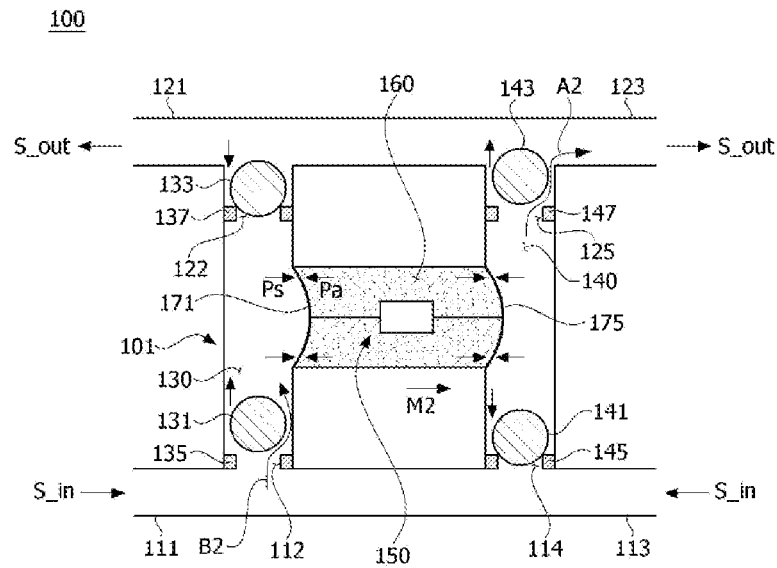
[Figure 4]
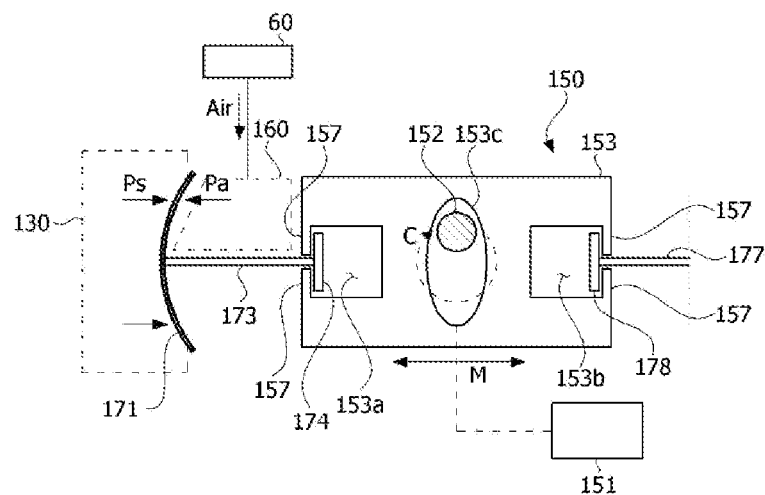

[Figure 5]
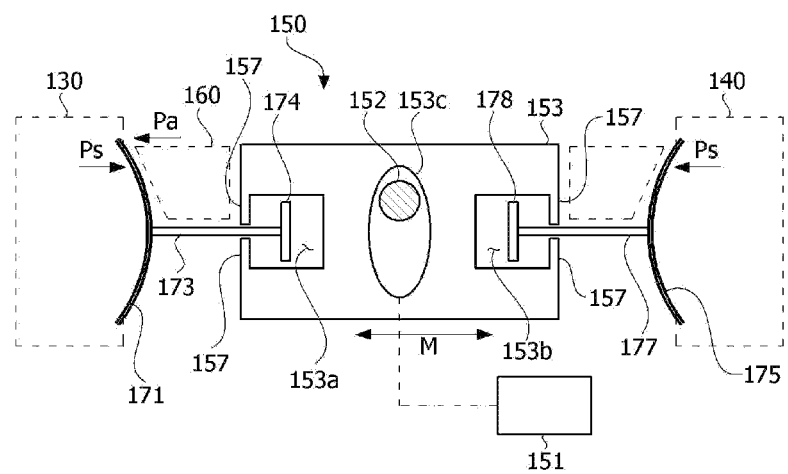

SLURRY TRANSFER DEVICE AND SLURRY TRANSFER METHOD USING THE SAME

CROSS-REFERENCE TO RELATED APPLICATIONS

This application is a national stage entry under 35 U.S.C. § 371 of International Application No. PCT/KR2023/000262, filed on Jan. 6, 2023, which claims priority to Korean Patent Application No. 10/2022-0001881, filed on Jan. 6, 2022, the disclosures of which are hereby incorporated by reference herein in their entireties.

TECHNICAL FIELD

The present invention relates to a slurry transfer device and a slurry transfer method using the same, which relates to, particularly, a transfer device of a negative electrode slurry for a secondary battery, and a method of transferring a negative electrode slurry for a secondary battery using the same.

BACKGROUND ART

In general, a secondary battery is a battery that chemical energy can be converted into electrical energy and released, and conversely, when the electrical energy is supplied in a discharged state, it can be stored again in the form of chemical energy, which refers to, that is, a battery capable of alternately repeating charging and discharging.

The secondary battery is manufactured through an electrode process, an assembly process, and an activation process. At this time, in a negative electrode slurry mixing process of a mixing process corresponding to a first step of the electrode process, a negative electrode active material, a conductive material, a binder, and a solvent are stirred, whereby a mixture is prepared in the form of a slurry.

The negative electrode slurry thus prepared is stored in an external tank, and the slurry in the tank is transferred to a coating device for performing a coating process through a pumping operation of a pneumatically driven pump connected to the tank. In addition, a filter is disposed on a transfer line transferring from the tank to the coating device.

At this time, in a process of operating the pneumatically driven pump for transfer of the negative electrode slurry, a phenomenon, in which the filter is clogged, occurs.

When the filter is clogged, the pipe pressure on the transfer line increases, and as a result, the quality of the negative electrode slurry is deteriorated due to pulsation, and there has been a problem that continuous production is difficult.

Therefore, there is a need for a transfer device of a negative electrode slurry for a secondary battery capable of preventing the quality of the negative electrode slurry from deteriorating during the transfer process and enabling continuous transfer.

DISCLOSURE

Technical Problem

It is a problem to be solved by the present invention to provide a slurry transfer device capable of preventing the quality of the slurry from deteriorating during transfer and extending a filter replacement cycle, and a slurry transfer method using the same.

Technical Solution

In order to solve the above problem, a slurry transfer device related to one example of the present invention comprises: a tank in which a slurry is stored; a pump provided to transfer the slurry in the tank and comprising pump chambers through which the slurry passes, an air chamber into which external air is introduced, and diaphragms disposed to partition the pump chambers and the air chamber and provided to adjust the volume of the pump chambers; a flow rate adjustment part, which is connected to the pump, for adjusting a flow rate of the air supplied to the air chamber; a filter provided such that the slurry discharged from the pump passes through; a pressure sensor, which is located between the pump and the filter, for measuring the pressure of the slurry during transfer; and a control part controlling the flow rate adjustment part based on a difference between the measured pressure measured by the pressure sensor and the air pressure supplied to the air chamber.

Also, the control part is provided to increase the flow rate of the air introduced into the air chamber when the difference between the air pressure supplied to the air chamber and the measured pressure measured by the pressure sensor is smaller than a predetermined reference pressure.

In addition, the control part is provided to decrease the flow rate of the air introduced into the air chamber when the difference between the air pressure supplied to the air chamber and the measured pressure measured by the pressure sensor is greater than a predetermined reference pressure.

Also, the reference pressure may be 0.1 bar to 0.5 bar.

In addition, the reference pressure may be 0.5 bar.

Also, the control part may control the flow rate adjustment part so that the air pressure in the air chamber is greater than the measured pressure measured by the pressure sensor.

In addition, the flow rate adjustment part may comprise a hole regulator.

Furthermore, the pump may be provided such that the slurry in the pump chamber is transferred when the air pressure in the air chamber is greater than the pressure in the pump chamber.

Also, the slurry may be a negative electrode slurry for a secondary battery, and the filter may be provided to filter foreign substances included in the transferred negative electrode slurry.

In addition, according to another aspect of the present invention, as a slurry transfer method using the slurry transfer device, a slurry transfer method comprising a step of controlling the flow rate adjustment part based on a difference between the measured pressure measured by the pressure sensor and the air pressure supplied to the air chamber is provided.

The slurry transfer method may comprise a step of increasing the flow rate of the air introduced into the air chamber when the difference between the air pressure supplied to the air chamber and the measured pressure measured by the pressure sensor is smaller than a predetermined reference pressure.

The slurry transfer method may comprise a step of decreasing the flow rate of the air introduced into the air chamber when the difference between the air pressure supplied to the air chamber and the measured pressure measured by the pressure sensor is greater than a predetermined reference pressure.

Also, the reference pressure may be 0.1 bar to 0.5 bar.

In addition, the slurry may be a negative electrode slurry for a secondary battery.

Advantageous Effects

As described above, according to the slurry transfer device related to at least one example of the present invention, and the slurry transfer method using the same, it is possible to prevent the quality of the slurry from deteriorating during transfer, and to increase the filter replacement cycle.

DESCRIPTION OF DRAWINGS

FIG. 1 is a configuration diagram of a slurry transfer device related to one example of the present invention.

FIGS. 2 to 5 are schematic diagrams for explaining one operating state of a pump constituting a slurry transfer device.

MODE FOR INVENTION

Hereinafter, a slurry conveying device according to one example of the present invention, and a slurry transfer method using the same will be described in detail with reference to the accompanying drawings.

In addition, regardless of the reference numerals, the same or corresponding components are given by the same or similar reference numerals, and duplicate descriptions thereof will be omitted, and for convenience of explanation, the size and shape of each component as shown can be exaggerated or reduced.

FIG. 1 is a configuration diagram of a slurry transfer device (1) related to one example of the present invention, and FIGS. 2 to 5 are schematic diagrams for explaining one operating state of a pump (100) constituting a slurry transfer device (1).

In this document, the slurry may be a negative electrode slurry for a secondary battery, and the slurry transfer device may be a transfer device of a slurry for a secondary battery.

Referring to FIG. 1, a slurry transfer device (1) related to one example of the present invention comprises a tank (10), a pump (100), a filter (30), a pressure sensor (40), a control part (50), and a flow rate adjustment part (60).

Specifically, the slurry transfer device (1) comprises a tank (10) in which a slurry (S) is stored, and a pump (100) provided to transfer the slurry (S) in the tank (10) and comprising pump chambers (130, 140) through which the slurry passes, an air chamber (160) into which external air is introduced, and diaphragms (171, 175) disposed to partition the pump chambers (130, 140) and the air chamber (160) and provided to adjust the volume of the pump chambers (130, 140).

Also, the slurry transfer device (1) comprises a flow rate adjustment part (60), which is connected to the pump (100), for adjusting a flow rate of the air supplied to the air chamber (160), a filter (30) provided such that the slurry discharged from the pump (100) passes through, and a pressure sensor (40), which is located on a transfer path between the pump (100) and the filter (30), for measuring the pressure of the slurry during transfer.

In addition, the slurry transfer device (1) comprises a control part (50) controlling the flow rate adjustment part (60) based on the difference between the measured pressure measured by the pressure sensor (40) and the air pressure supplied to the air chamber.

Furthermore, the slurry transfer device (1) may comprise an air supply part (20) for supplying air to the pump (100) through the flow rate adjustment part (60). The air supply part (20) may be provided to supply air at a predetermined pressure, and the flow rate adjustment part (60) may perform a function of adjusting the flow rate and pressure of the air supplied from the air supply part (20). In addition, the flow rate adjustment part (60) may comprise a hole regulator.

At this time, the control part (50) is electrically connected to each of the pressure sensor and the flow rate adjustment part. The measured pressure measured by the pressure sensor (40) and the air pressure adjusted while passing through the flow rate adjustment part (60) are transmitted to the control part (50), and the control part (50) adjusts the flow rate and pressure of the air passing through the flow adjustment part (60) based on the difference between the measured pressure measured by the pressure sensor (40) and the air pressure supplied to the air chamber (160). Through this, it is possible to adjust the air pressure of the air chamber (160) in the pump (100).

Also, the slurry transfer device (1) may comprise a pipe part (70) for connecting the tank (10) and the pump (100). The pipe part (70) may comprise a first pipe (71) connecting the tank (10) and the inlet end of the pump (P, 100), and a second pipe (72) connected to the discharge end of the pump (100).

In addition, the pressure sensor (40) and the filter (30) may each be provided on the second pipe (72), where the second pipe (72) may be divided into a first region (73) at the upstream side of the filter (30) and a second region (74) at the downstream side passing through the filter (30) along the slurry transfer direction. As described above, the slurry (S) may be transferred to an electrode coating process, which is a next process, through the second pipe (72).

The tank (10) stores the negative electrode slurry (S) prepared through the negative electrode mixing process. For example, the negative electrode slurry may be a slurry in which a negative electrode active material, a conductive material, a binder, and a solvent are mixed. At this time, since all types known in the art may be used as the types of the negative electrode active material, conductive material, binder, and solvent, they are not particularly limited.

The pump (100) is a device to transfer the slurry (S) by performing a pressure action, which transfers the negative electrode slurry stored in the tank (10).

As one example, the pump (100) may be driven by an electrical signal. Also, the pump (100) may be a low pulsation pump. Specifically, the pump may be a pump with low vibration. For example, the pump may have a pulsation of 0.2 bar or less. By using the low pulsation pump, it is possible to increase the filter replacement cycle.

In addition, the pump (100) may be an electric double diaphragm pump, and for example, Graco's H2150E model may also be used as the pump. Such an electric double diaphragm pump is provided so that when the air pressure in the air chamber is greater than the pressure in the pump chamber, the slurry in the pump chamber is transferred by a pumping action. Unlike this, the electric double diaphragm pump is provided so that when the air pressure in the air chamber is lower than the pressure in the pump chamber, the pumping action is not performed in the pump chamber. Therefore, for the pumping action, the air pressure in the air chamber is important, and the air pressure in the air chamber is configured to be adjustable through a hole regulator or the like.

Referring to FIGS. 2 and 3, the pump (100) of one embodiment may be an electric double diaphragm pump, where the pump (100) comprises a housing (101) having first and second inflow parts (111, 113), and first and second discharge parts (121, 123). The slurry (S_in) is introduced into the housing (101) through the first and second inflow parts (111, 113). The first and second inflow parts (111, 113) are each connected to the first pipe (71) to enable fluid migration.

The slurry (S_out) is discharged to the outside (second pipe) through the first and second discharge parts (121, 123) by the pumping action inside the housing (101). The first and second discharge parts (121, 123) are each connected to the second pipe (72) to enable fluid migration.

The pump (100) comprises a first pump chamber (130), a second pump chamber (140), and an air chamber (160), which are each provided inside the housing (101).

The first pump chamber (130) connects the first inflow part (111) and the first discharge part (121), and the second pump chamber (140) connects the second inflow part (113) and the second discharge part (123). The first and second pump chambers (130, 140) are spaces where the pumping action of the slurry introduced through the respective inlets is performed.

Also, the pump (100) comprises a first diaphragm (171) provided to partition the first pump chamber (130) and the air chamber (160), and a second diaphragm (175) provided to partition the second pump chamber (140) and the air chamber (160).

In addition, a drive part (150) for elongating and contracting the first diaphragm (171) and the second diaphragm (175) is included. The drive part (150) is disposed in the air chamber (160). The drive part (150) changes the volumes of the first pump chamber (130) and the second pump chamber (140) by interlocking the first diaphragm (171) and the second diaphragm (175) to elongate and contract them, and as a result, the pumping action is performed alternately in the first pump chamber (130) and the second pump chamber (140).

The drive part (150) comprises a motor (151); a cam (152) connected to the drive shaft of the motor (151) and provided to rotate together with the motor; and a drive plate (153) having a first receiving groove (153*a*) provided at a position facing the first pump chamber (130), a second receiving groove (153*b*) provided at a position facing the second pump chamber (140), and a cam hole (153*c*) in which the cam (152) is disposed. The cam hole (153*c*) may be positioned between the first and second receiving grooves (153*a*, 153*b*). In the first and second receiving grooves (153*a*, 153*b*), regions facing the first and second pump chambers (130, 140), respectively, are partially opened, and drive shafts (173, 177) to be described below may pass through the opened portions.

Also, the drive part (150) comprises a first drive shaft (173) disposed to be slidably movable in the first receiving groove (153*a*) and connected to the first diaphragm (171), and a second drive shaft (177) disposed to be slidably movable in the second receiving groove (153*b*) and connected to the second diaphragm (175).

In addition, a locking jaw (157) is provided in the first receiving groove (153*a*) such that the first drive shaft (173) does not deviate to the outside of the first receiving groove (153*a*), and a locking plate (174) provided to contact the locking jaw (157) is provided on the first drive shaft (173). Furthermore, a locking jaw (157) is provided in the second receiving groove (153*b*) such that the second drive shaft (177) does not deviate to the outside of the second receiving groove (153*b*), and a locking plate (177) provided to contact the locking jaw (157) is provided on the second drive shaft (177).

In this structure, when the motor (151) rotates, the cam (152) rotates to make a circular motion (C), and as the cam hole (153*c*) is formed in the form of a long hole having a long axis in the vertical direction, the drive plate (153) in the air chamber (160) moves in left and right directions (M: M1, M2) along a virtual line connecting the first pump chamber (130) and the second pump chamber (140).

Also, the first pump chamber (130) has a first hole (112) connected to the first inflow port (111) and a second hole (122) connected to the first discharge port (121). In the first pump chamber (130), a first ball (131) disposed on the side of the first hole (112), a first stopper (135) for closing the first hole (112) upon contact with the first ball (131), a second ball (133) disposed on the side of the second hole (122), and a second stopper (137) provided to close the second hole (122) upon contact with the second ball (133) are included. The stoppers (135, 137) may each have a ring shape, where the balls (131, 133) are each disposed so that they can be inserted into the openings of the rings upon contact with the stoppers (135, 137), and when the balls (131, 133) are inserted into the openings of the rings, the holes (112, 122) are each converted to a closed state. In addition, when the balls (131, 133) are separated from the stoppers, the slurry may flow through the ring openings of the stoppers (135, 137).

Furthermore, the second pump chamber (140) has a third hole (114) connected to the second inflow port (113) and a fourth hole (125) connected to the second discharge port (123). In the second pump chamber (140), a third ball (141) disposed on the side of the third hole (114), a third stopper (145) for closing the third hole (114) upon contact with the third ball (141), a fourth ball (143) disposed on the side of the fourth hole (125), and a fourth stopper (147) provided to close the fourth hole (125) upon contact with the fourth ball (143) are included. The stoppers may each have a ring shape, where the balls are each disposed so that they can be inserted into the openings of the rings upon contact with the stoppers, and when the balls are inserted into the openings of the rings, the holes are each converted to a closed state.

Referring to FIGS. 2 and 3, along the left and right movement of the drive plate (153), the first diaphragm (171) changes the volume of the first pump chamber (130), and the second diaphragm (175) changes the volume of the second pump chamber (130).

Along the movement of the drive plate (153), the first and second drive shafts (173, 177) disposed in the respective receiving grooves (153*a*, 153*b*) move, and accordingly, the first and second diaphragms (171, 175) each elongate and contract.

Referring to FIGS. 2 and 4, when the drive plate (153) in the air chamber (160) moves in a direction (M1) approaching the first pump chamber (130) by operating the drive part (150), the first diaphragm (171) moves in a direction where the region connected to the first drive shaft (173) is away from the second pump chamber, and elongates and contracts so that the volume of the first pump chamber (130) decreases, and the second diaphragm (175) moves in a direction where the region connected to the drive shaft (177) becomes closer to the first pump chamber, and elongates and contracts so that the volume of the second pump chamber (140) increases. At this time, in the first pump chamber (130), the first ball (131) contacts the first stopper (135) to close the first hole (112), and the second ball (133) is separated from the second stopper (137) to open the second hole (122). The slurry (A1) in the first pump chamber (130) is discharged toward the first discharge port (121) through the second hole (122) by the pumping action. Also, in the second pump chamber (140), the third ball (141) is away from the third stopper (145) to open the third hole (114), and the fourth ball (143) contacts the fourth stopper (147) to close the fourth hole (125). In this case, the slurry (B1) is introduced into the second pump chamber (140) through the third hole (125).

Hereinafter, referring to FIGS. 3 and 4, when the drive plate (153) in the air chamber (160) moves in a direction (M2) approaching the second pump chamber (140), the first diaphragm (171) moves in a direction where the region connected to the first drive shaft (173) becomes closer to the second pump chamber, and elongates and contracts so that the volume of the first pump chamber (130) increases, and the second diaphragm (175) moves in a direction where the region connected to the second drive shaft (177) is away from the first pump chamber, and elongates and contracts so that the volume of the second pump chamber (140) decreases. At this time, in the first pump chamber (130), the first ball (131) is separated from the first stopper (135) to open the first hole (112), and the second ball (133) contacts the second stopper (137) to close the second hole (122). At this time, the slurry (B2) is introduced into the first pump chamber (130) through the first hole (112). Also, in the second pump chamber (140), the third ball (141) contacts the third stopper (145) to close the third hole (114), and the fourth ball (143) is separated from the fourth stopper (147) to open the fourth hole (125). The slurry (A2) in the second pump chamber (140) is discharged toward the second discharge port (123) through the fourth hole (125) by the pumping action.

As the drive plate (153) continuously moves in the left and right directions (M) as such, the slurry is discharged alternately from the first pump chamber (130) and the second pump chamber (140) to the respective discharge ports, and the slurry transfer proceeds.

Meanwhile, referring to FIGS. 4 and 5, the first surface of the diaphragm facing the pump chamber is pressurized by the slurry pressure (Ps) in the pump chamber, and the second surface opposite to the first surface of the diaphragm is pressurized by the air pressure (Pa) of the air chamber.

That is, the first surface of the first diaphragm (171) facing the first pump chamber (130) is pressurized by the slurry pressure (Ps) in the first pump chamber (130), and the second surface in the opposite direction to the first surface of the first diaphragm (171) is pressurized by the air pressure (Pa) of the air chamber (160). Similarly, the first surface of the second diaphragm (175) facing the second pump chamber (140) is pressurized by the slurry pressure (Ps) in the second pump chamber (140), and the second surface in the opposite direction to the first surface of the second diaphragm (175) is pressurized by the air pressure (Pa) of the air chamber (160).

At this time, the electric double diaphragm pump is provided so that when the air pressure (Pa) of the air chamber is greater than the pressure (Ps) of the pump chamber, the slurry in the pump chamber is transferred by the pumping action, and provided so that when the air pressure (Pa) of the air chamber is smaller than the pressure (Ps) of the pump chamber, the pumping action is not made in the pump chamber.

As in FIG. 4, when the air pressure (Pa) of the air chamber is greater than the pressures of the first and second pump chambers, the locking plates (174, 178) of the drive shafts (173, 177) connected to the first and second diaphragms, respectively, are designed to engage in the locking jaws (157) of the respective receiving grooves (153a, 153b), and provided so that the respective drive shafts (173, 177) move together along the movement of the drive plate (153). In this way, when the drive plate (153) moves, the respective drive shafts must be moved together, whereby the elongation and contraction operations of the first and second diaphragms are performed, and the pumping action occurs.

Referring to FIG. 5, when the air pressure (Pa) of the air chamber is smaller than the pressures of the first and second pump chambers, the locking plates (174, 178) of the drive shafts (173, 177) connected to the first and second diaphragms (171, 175), respectively are designed such that the locking plates (174, 178) are located inside the respective receiving grooves without engaging with the locking jaws (157) of the respective receiving grooves. In this case, when the drive plate (153) moves in the left and right directions, the respective drive shafts (173, 177) do not move together, and the elongation and contraction operations of the first and second diaphragms are not performed, so that no pumping action occurs.

Therefore, in order that the pumping action occurs in the first and second pump chambers (130, 140), the air pressure (Pa) of the air chamber (160) is important, and it is provided that the air pressure (Pa) of the air chamber (160) can be adjusted through the above-described flow rate adjustment part (60). In addition, for the slurry transfer, the air pressure (Pa) of the air chamber (160) should be maintained higher than the pressure in the pump chamber by a preset reference pressure.

As described above, the pump (100) may be provided such that when the air pressure (Pa) of the air chamber is greater than the pressure (Ps) of the pump chamber, the slurry in the pump chamber is transferred, and the control part (50) may increase the flow rate of the air introduced into the air chamber, when the difference between the air pressure supplied to the air chamber (160) and the measured pressure measured by the pressure sensor (40) is smaller than a predetermined reference pressure. That is, when the filter (30) is gradually clogged and the transfer pressure of the slurry in the second pipe (72) increases, the pressures (Ps) of the respective pump chambers (130, 140) also increases together. As a result, the difference between the air pressure supplied to the air chamber (160) and the pressure in the pump chamber becomes small, the control part is provided such that by controlling the flow rate adjustment part (60), the air flow rate supplied to the air chamber (160) is increased. As the air flow rate increases, the pressure in the air chamber increases, whereby the difference between the air pressure supplied to the air chamber (160) and the pressure in the pump chamber may be maintained by a preset reference pressure. Meanwhile, the undescribed reference numeral 61 denotes an air pipe (61) connecting the flow rate adjustment part (60) and the air chamber (160).

Unlike this, the control part (50) may reduce the flow rate of the air introduced into the air chamber when the difference between the air pressure (Pa) supplied to the air chamber (160) and the measured pressure measured by the pressure sensor is greater than a predetermined reference pressure. That is, when it is determined that the difference between the air pressure (Pa) and the pressure in the pump chamber is maintained greater than the reference pressure, the control part (50) may reduce the flow rate of the air introduced into the air chamber.

The reference pressure may be 0.1 bar to 0.5 bar, and the reference pressure may be 0.5 bar.

In addition, the control part (50) may control the flow rate adjustment part (60) so that the air pressure of the air chamber is greater than the measured pressure measured by the pressure sensor. The air pressure of the air chamber may be a pressure adjusted by a predetermined pressure value in the flow rate adjustment part (60).

The filter (40) performs a function to filter the transferred negative electrode slurry and is disposed on the discharge side of the pump. The negative electrode slurry transferred by the pump may be transferred to a next process after passing through the filter.

In one example, the filter (40) may filter foreign substances included in the transferred negative electrode slurry, and in one example, the filter may filter, for example, foreign substances having a particle size of 50 μm to 200 μm.

The pressure sensor (40) may be a pressure transmitter, which is provided to measure the pressure on the transfer line between the discharge end of the pump and the filter upon the pump drive. That is, it may be provided to measure the transfer pressure of the slurry in the first region (73) of the second pipe (72).

In addition, the control part may be provided to perform control with a PLC (Programmable Logic Controller) for precise motion control to which an automatic pressure correction program is applied.

Through this, the flow rate adjustment part (60) may adjust the flow rate of air so that the air pressure in the air chamber is maintained higher than the pressure measured by the pressure transmitter. It is provided that the air pressure in the air chamber is adjusted according to the flow rate of the air introduced into the air chamber.

In addition, the air supply part (20) may be provided to supply air within a utility installed in a secondary battery manufacturing plant.

Furthermore, a method of transferring a negative electrode slurry for a secondary battery using the transfer device of a negative electrode slurry for a secondary battery having the above structure will be described.

As a slurry transfer method using the slurry transfer device, the slurry transfer method related to one example of the present invention comprises a step of controlling the flow rate adjustment part based on a difference between the measured pressure measured by the pressure sensor and the air pressure supplied to the air chamber.

The slurry transfer method may comprise a step of increasing the flow rate of the air introduced into the air chamber when the difference between the air pressure supplied to the air chamber and the measured pressure measured by the pressure sensor is smaller than a predetermined reference pressure.

The slurry transfer method may comprise a step of decreasing the flow rate of the air introduced into the air chamber when the difference between the air pressure supplied to the air chamber and the measured pressure measured by the pressure sensor is greater than a predetermined reference pressure.

Also, the reference pressure may be 0.1 bar to 0.5 bar.

In addition, the slurry may be a negative electrode slurry for a secondary battery.

The examples of the present invention as described above have been disclosed for illustrative purposes, and those skilled in the art having ordinary knowledge of the present invention will be able to make various modifications, changes, and additions within the spirit and scope of the present invention, and such modifications, changes, and additions should be regarded as falling within the scope of the following claims.

INDUSTRIAL APPLICABILITY

According to a slurry transfer device related to at least one example of the present invention, and a slurry transfer method using the same, it is possible to prevent the quality of the slurry from deteriorating during transfer, and to increase the filter replacement cycle.

The invention claimed is:

1. A slurry transfer device comprising:
a tank in which a slurry is stored;
a pump configured to transfer the slurry from the tank, the pump comprising pump chambers configured to receive passage of the slurry therethrough, an air chamber configured to receive introduction of air therein, and diaphragms partitioning the pump chambers from the air chamber and configured to adjust volumes of the pump chambers;
a flow rate adjustment part connected to the pump and configured to adjust a flow rate of the air introduced to the air chamber;
a filter configured to receive discharge of the slurry from the pump therethrough;
a pressure sensor located between the pump and the filter, the pressure sensor configured to measure a pressure of the slurry; and
a control part configured to control the flow rate adjustment part based on a difference between the pressure of the slurry and a pressure of the air introduced to the air chamber.

2. The slurry transfer device according to claim 1, wherein the control part is configured to increase the flow rate of the air introduced to the air chamber when the difference between the air pressure of the air introduced to the air chamber and the pressure of the slurry is smaller than a predetermined reference pressure.

3. The slurry transfer device according to claim 2, wherein the control part is configured to decrease the flow rate of the air introduced to the air chamber when the difference between the pressure of the air introduced to the air chamber and the pressure of the slurry is greater than the predetermined reference pressure.

4. The slurry transfer device according to claim 2, wherein the predetermined reference pressure is 0.1 bar to 0.5 bar.

5. The slurry transfer device according to claim 4, wherein the predetermined reference pressure is 0.5 bar.

6. The slurry transfer device according to claim 1, wherein the control part is configured to control the flow rate adjustment part so that the pressure of the air introduced to the air chamber is greater than the pressure of the slurry.

7. The slurry transfer device according to claim 1, wherein the flow rate adjustment part comprises a hole regulator.

8. The slurry transfer device according to claim 1, wherein the pump is configured to transfer the slurry from the pump chamber when the pressure of the air introduced to the air chamber is greater than the pressure of the slurry.

9. The slurry transfer device according to claim 1, wherein the slurry is a negative electrode slurry for a secondary battery.

10. A method of using the slurry transfer device according to claim 1, the method comprising controlling the flow rate adjustment part based on a difference between a measured pressure measured by the pressure sensor and the pressure of the air introduced to the air chamber.

11. The method according to claim 10, further comprising increasing a flow rate of the air introduced to the air chamber when the difference between the pressure of the air introduced to the air chamber and the measured pressure measured by the pressure sensor is smaller than a predetermined reference pressure.

12. The method according to claim 11, further comprising of decreasing a flow rate of the air introduced to the air chamber when the difference between the pressure of the air introduced to the air chamber and the measured pressure measured by the pressure sensor is greater than the predetermined reference pressure.

13. The method according to claim 11, wherein the predetermined reference pressure is 0.1 bar to 0.5 bar.

14. The method according to claim 10, wherein the slurry is a negative electrode slurry for a secondary battery.

* * * * *